United States Patent
Wang et al.

(10) Patent No.: US 9,118,886 B2
(45) Date of Patent: Aug. 25, 2015

(54) ANNOTATING GENERAL OBJECTS IN VIDEO

(71) Applicant: Hulu, LLC, Santa Monica, CA (US)

(72) Inventors: Zhibing Wang, Beijing (CN); Dong Wang, Beijing (CN); Tao Xiong, Beijing (CN); Cailiang Liu, Beijing (CN); Joyce Zhang, Beijing (CN); Heng Su, Beijing (CN)

(73) Assignee: HULU, LLC, Santa Monica, CA (US)

( * ) Notice: Subject to any disclaimer, the term of this patent is extended or adjusted under 35 U.S.C. 154(b) by 75 days.

(21) Appl. No.: 13/944,583

(22) Filed: Jul. 17, 2013

(65) Prior Publication Data

US 2014/0023341 A1   Jan. 23, 2014

Related U.S. Application Data

(60) Provisional application No. 61/673,193, filed on Jul. 18, 2012.

(51) Int. Cl.
| | |
|---|---|
| *H04N 5/92* | (2006.01) |
| *H04N 9/87* | (2006.01) |
| *G11B 27/031* | (2006.01) |
| *G11B 27/10* | (2006.01) |
| *G11B 27/32* | (2006.01) |
| *H04N 21/234* | (2011.01) |
| *H04N 21/2343* | (2011.01) |
| *H04N 21/2665* | (2011.01) |
| *H04N 21/4722* | (2011.01) |
| *H04N 21/4728* | (2011.01) |
| *H04N 21/6587* | (2011.01) |
| *H04N 21/81* | (2011.01) |
| *H04N 21/858* | (2011.01) |

(52) U.S. Cl.
CPC ............... *H04N 9/87* (2013.01); *G11B 27/031* (2013.01); *G11B 27/105* (2013.01); *G11B 27/322* (2013.01); *H04N 21/23418* (2013.01); *H04N 21/234318* (2013.01); *H04N 21/2665* (2013.01); *H04N 21/4722* (2013.01); *H04N 21/4728* (2013.01); *H04N 21/6587* (2013.01); *H04N 21/8133* (2013.01); *H04N 21/8586* (2013.01)

(58) Field of Classification Search
CPC ..... H04N 9/87; H04N 21/00; H04N 21/6587; H04N 21/8133; H04N 21/8586; G11B 27/322; G11B 27/105; G11B 27/031
USPC .......................................................... 386/240
See application file for complete search history.

(56) References Cited

U.S. PATENT DOCUMENTS

| 7,103,848 B2 * | 9/2006 | Barsness et al. ............... 715/776 |
| 2005/0276460 A1 * | 12/2005 | Silver ........................... 382/141 |

(Continued)

*Primary Examiner* — William Tran
(74) *Attorney, Agent, or Firm* — Fountainhead Law Group PC

(57) ABSTRACT

A method for annotating general objects contained in video content is provided. The method sends video data to a client device and receives a first annotation from the client device defining a boundary around a portion of a first frame of the video data. Then, the first annotation is tracked through multiple frames of the video content. Other annotations determined to be associated with annotation that match the first annotation within a threshold are determined where the other annotations are received from other client devices and located in the first frame or other frames from the first frame. The method combines the other annotations and the first annotation into an object track and associates a tag with the object track. The tag is input by at least one of the client devices.

20 Claims, 16 Drawing Sheets

(56) References Cited

U.S. PATENT DOCUMENTS

| | | | |
|---|---|---|---|
| 2008/0189336 A1* | 8/2008 | Prihodko | 707/104.1 |
| 2009/0248610 A1* | 10/2009 | Sigurbjornsson et al. | 707/1 |
| 2010/0088726 A1* | 4/2010 | Curtis et al. | 725/45 |
| 2012/0078899 A1* | 3/2012 | Fontana et al. | 707/736 |
| 2014/0029801 A1* | 1/2014 | Chua et al. | 382/103 |

\* cited by examiner

*FIG. 6*
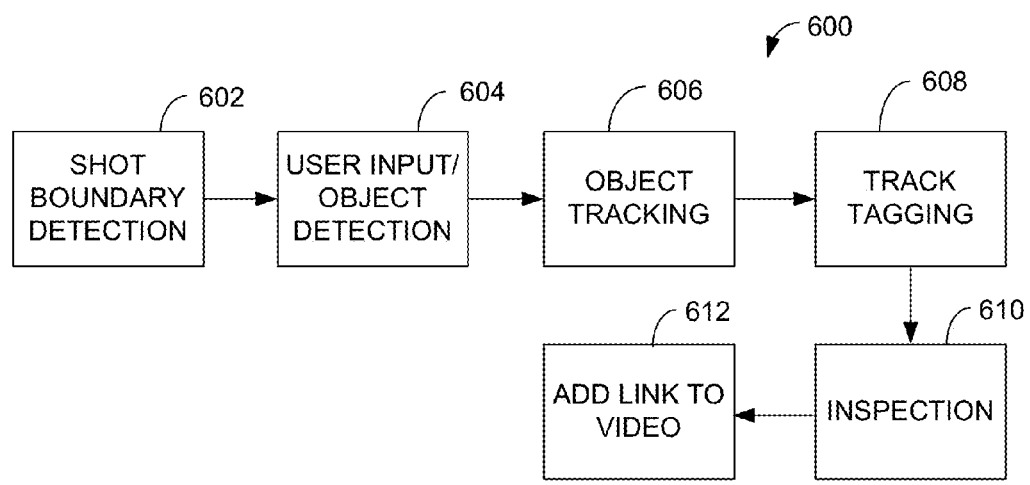
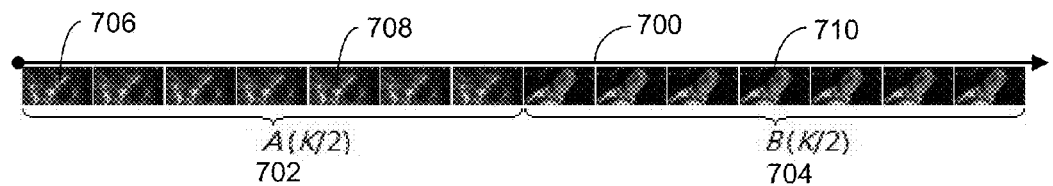
*FIG. 7*

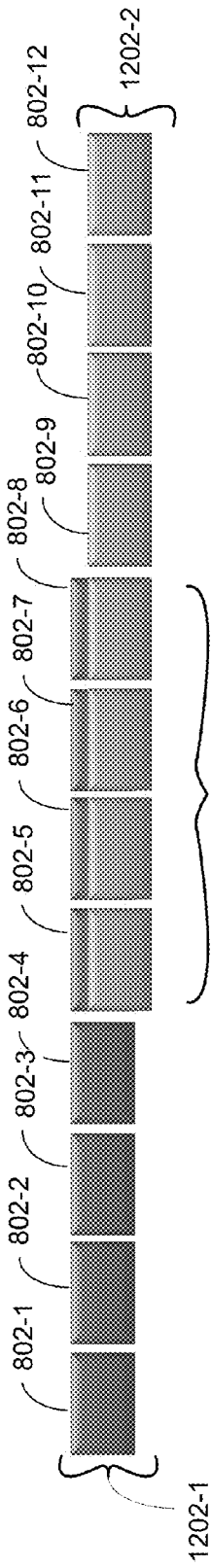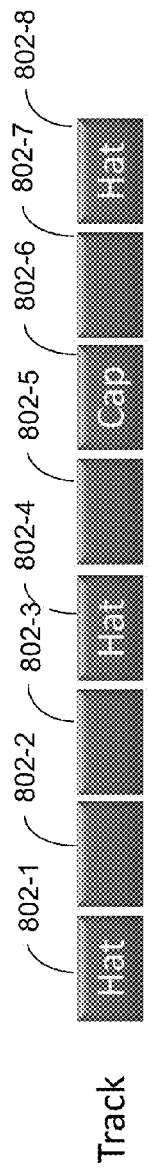

1610 — CONFIGURING AT LEAST ONE USER-SELECTABLE LINK TO BE ACTIVATED ALONG THE OBJECT TRACK THROUGH MULTIPLE FRAMES OF THE VIDEO DATA, WHEREIN THE USER-SELECTABLE LINK COMPRISES A DATA ADDRESS FOR OBTAINING ADDITIONAL INFORMATION ABOUT AN OBJECT IDENTIFIED WITH THE CHARACTERISTIC FEATURES

1620 — STORING THE VIDEO DATA ASSOCIATED WITH THE USER-SELECTABLE LINK IN A COMPUTER MEMORY

1630 — STORING THE ADDITIONAL INFORMATION ABOUT THE OBJECT IN A MEMORY LOCATION ADDRESSED BY THE DATA ADDRESS

1640 — SERVING THE VIDEO DATA ASSOCIATED WITH THE LINK TO A CLIENT DEVICE

1650 — SERVING THE ADDITIONAL INFORMATION ABOUT THE OBJECT TO THE CLIENT DEVICE, IN RESPONSE TO SELECTION OF THE LINK AT THE CLIENT DEVICE (A)

ANNOTATING GENERAL OBJECTS IN VIDEO

CROSS REFERENCES TO RELATED APPLICATIONS

The present disclosure claims priority to U.S. Provisional App. No. 61/673,193, entitled "ANNOTATING GENERAL OBJECTS IN VIDEO", filed Jul. 18, 2012, the contents of which is incorporated herein by reference in its entirety.

FIELD

The present application relates generally to input/output processing using a computer, and more particularly to augmenting video with general object recognition features, including preparing augmented video and playing augmented video using a media device to provide interactive object recognition features.

BACKGROUND

Electronic video data often includes interactive features related to images appearing in video output. For example, Adobe™ Flash™, Blu-ray™, and other media player applications support layered video, overlays, and similar features that can be included with video data. Using such features, video data may incorporate objects within the picture frame itself that are responsive to user input to link to further information. For example, video data may be configured with areas or objects that a user may select using input from a touchscreen, pointing device, or the like. In response to detecting user selection input directed to a preconfigured object appearing in a video, a computer may take some predetermined action based on the identity of the selected object. For example, the computer may obtain and display some additional information about the interactive object in a separate window or display area.

Embedded interactivity, however, has not become commonplace even in environments that readily support user interactivity, for example, in personal computers, notepad computers, smartphones, and so forth. Prior methods for preparing interactive content embedded in video content may require a significant amount of manual configuration and planning. Such requirements may discourage the creation of interactive content and limit its distribution. In addition, much video content is still primarily viewed on non-interactive platforms such as televisions, which may further reduce the incentives for producing interactive video content.

BRIEF DESCRIPTION OF THE DRAWINGS

The present technology, in accordance with one or more various embodiments, is described in detail with reference to the following figures. The drawings are provided for purposes of illustration only and merely depict typical or example embodiments of the technology. These drawings are provided to facilitate the reader's understanding of the technology and shall not be considered limiting of the breadth, scope, or applicability of the technology.

FIG. 6 is a flow chart illustrating aspects of an algorithm for general object annotation.

FIG. 7 illustrates a window of 'K' frames sequenced along a time axis 700 according to one embodiment.

FIGS. 12A and 12B show examples of merging tracks according to one embodiment.

FIG. 13 shows an example of tags according to one embodiment.

FIGS. 15-20 are diagrams illustrating operations that may be performed by a server system in connection with general object annotation in video data.

DETAILED DESCRIPTION

Figure 1:
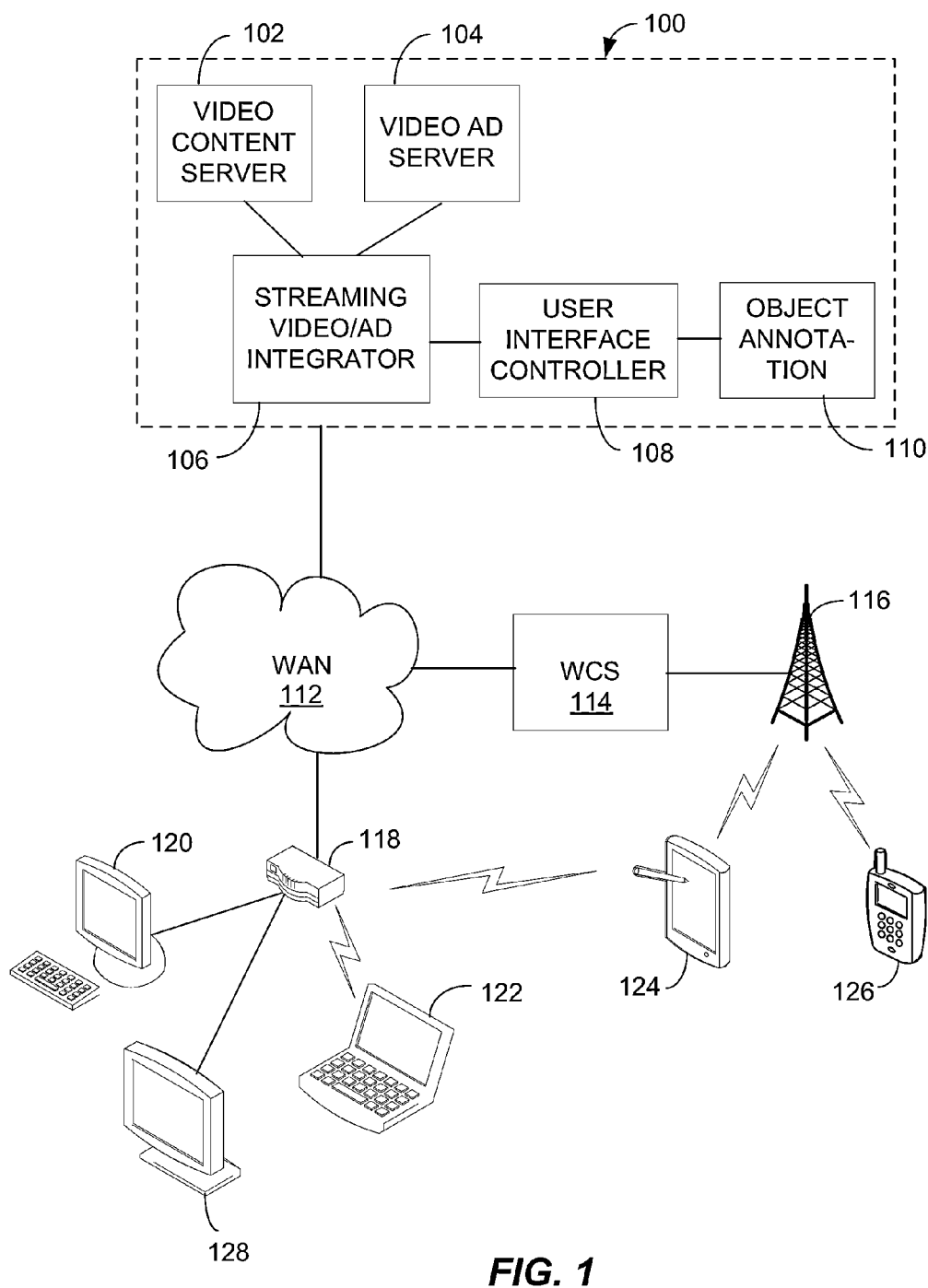
FIG. 1 is a schematic diagram illustrating an embodiment of a computing environment in which systems and methods discussed herein may be implemented.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

Although not limited to video streaming systems, features and aspects as disclosed herein may be implemented within a system including a video streaming system 100 in communication with multiple client devices via one or more communication networks. The video streaming system 100 may include one or more computer servers or modules 102, 104, 106, 108 and/or 110 distributed over one or more computers. Each server 102, 104, 110 may include, or may be operatively coupled to, one or more data stores, for example databases, indexes, files, or other data structures. A video content server 102 may access a data store of various video programs; for example, television episodes, motion pictures, and other content produced as primary content of interest to consumers. The video content server 102 may serve the video programs as directed by a user interface controller module 108.

A video advertising server 104 may access a data store of relatively short video segments (e.g., 10 second, 30 second, or 60 second video advertisements) configured as advertising for a particular advertiser or message. The advertising may be provided for an advertiser in exchange for payment of some kind, or may comprise a promotional message for the system 100, a public service message, or some other information. The ad server 104 may serve the video advertising segments as directed by the user interface controller 108.

An object annotation component 110 may be called by the system 100 for video streaming sessions in which an object annotation feature is activated by user input. The object annotation component may be used to receive and aggregate user input data for developing video content with annotated object features. In addition, the object annotation component 110 may enable use of object annotation in video data streamed from the server 100.

The video streaming system 100 may further include an integrator component 106 that integrates video content and video advertising into a streaming video program as directed by the controller 108. The controller 108 may determine the selection or configuration of advertising in the streaming video based on algorithms or processes as described herein for next video ad selection or next video content suggestion and selection. In next ad selection, the controller 108 may select an ad for streaming in a future ad slot of a streaming video. In next video content selection, the controller 108 may select a suggested video content title based on the session analysis during streaming of a first video, without using a user identity. The controller 108 may cause the suggested title to be provided to the client for presentation to the user. In response to a signal from the client indicating user acceptance of the suggestion, the controller 108 may stream the suggested video to the client upon termination of the first video. The video streaming system 100 may include other modules or units not depicted in FIG. 1, for example administrative servers, commerce servers, network infrastructure, advertising selection engines, and so forth.

The video streaming system 100 may connect to a data communication network 112. A data communication network 112 may comprise a local area network (LAN), a wide area network (WAN), for example, the Internet, a telephone network, a wireless cellular telecommunications network 114, or some combination of these or similar networks.

One or more client devices may be in communication with the video streaming system 100, via the data communication network 116 and/or other network 114. Such client devices may include, for example, one or more laptop computers 122, desktop computers 120, "smart" mobile phones 126, notepad devices 124, network-enabled televisions 128, or combinations thereof. Each of the client devices may be communicatively coupled to the video streaming system 100 via a router 118 for a LAN, via a base station 116 for a wireless telephony network 114, or via some other connection. In operation, such client devices 120, 122, 124, 126, 128 may send and receive data or instructions to the system 100, in response to user input received from user input devices or other input. In response, the system 100 may serve video programs, selected advertising and next video content to the client devices 120, 122, 124, 126, 128. The devices 120, 122, 124, 126, 128 may output video from the streaming video program using a display screen, projector, or other video output device. In certain embodiments, the system 100 in accordance with the features and aspects disclosed herein may be configured to operate within or support a cloud computing environment. For example, a portion of, or all of, the servers 102, 104 or 110 may reside in a cloud server.

In streaming, a server 100 streams audio-video data continuously to a media player component operating at least partly on the client device (e.g., devices 120, 122, 124, 126, 128), which may play the audio-video data concurrently with receiving the streaming data from the server. The client player component may initiate play of the video data immediately after receiving an initial portion of the data from the content provider. Unlike progressive downloading, streaming video can be delivered on-demand or live. Progressive download may require downloading the entire file or downloading enough of the entire file to start playback at the beginning, whereas streaming may enable nearly immediate playback at any point within the file. End-users may skip through the video file to start playback or change playback to any point in the media file. Hence, the end-user does not need to wait for the file to progressively download. Typically, streaming video is delivered from a few dedicated servers having high bandwidth capabilities.

In other aspects, the streaming video server 100 may include a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. A streaming media server may communicate with the client device using control messages and data messages to adjust to changing network conditions as the video is played. These control messages can include commands for enabling control functions such as fast forward, fast reverse, pausing, or seeking to a particular part of the file at the client. Since a streaming media server transmits video data only as needed and at the rate that is needed, precise control over the number of streams served can be maintained.

Unlike the case with progressive downloading, the viewer will not be able to view high data rate videos over a lower data rate transmission medium. However, streaming media servers (1) provide users random access to the video file, (2) allow monitoring of who is viewing what video programs and how long they are watched, (3) use transmission bandwidth more efficiently, since only the amount of data required to support the viewing experience is transmitted, and (4) allow more control over the content, because the streaming video data is discarded by the media player after use.

Streaming media servers may use HTTP and TCP to deliver video streams via a WAN 112, but generally use RSTP (real time streaming protocol) and UDP (user datagram protocol) instead. These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth. Another protocol used for streaming is hypertext transfer protocol (HTTP) live streaming (HLS). The HLS protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

In contrast to steaming video, progressively downloaded video may be transmitted to the user device at a rate that is faster than playback. The client video player buffers this data, and may indicate how much of the video program has been buffered by providing an indicator, usually as a part of a "progress bar." A control is often provided that allows the user to go to any point in the program that has already been buffered by selecting the control and moving it to a different location along the progress bar. This allows the user to randomly access any buffered portion of the video program. Streaming media players do not rely on buffering to provide random access to any point in the video program. Instead, this is accomplished through the use of control messages transmitted from the client video player to the streaming video server.

Figure 2:
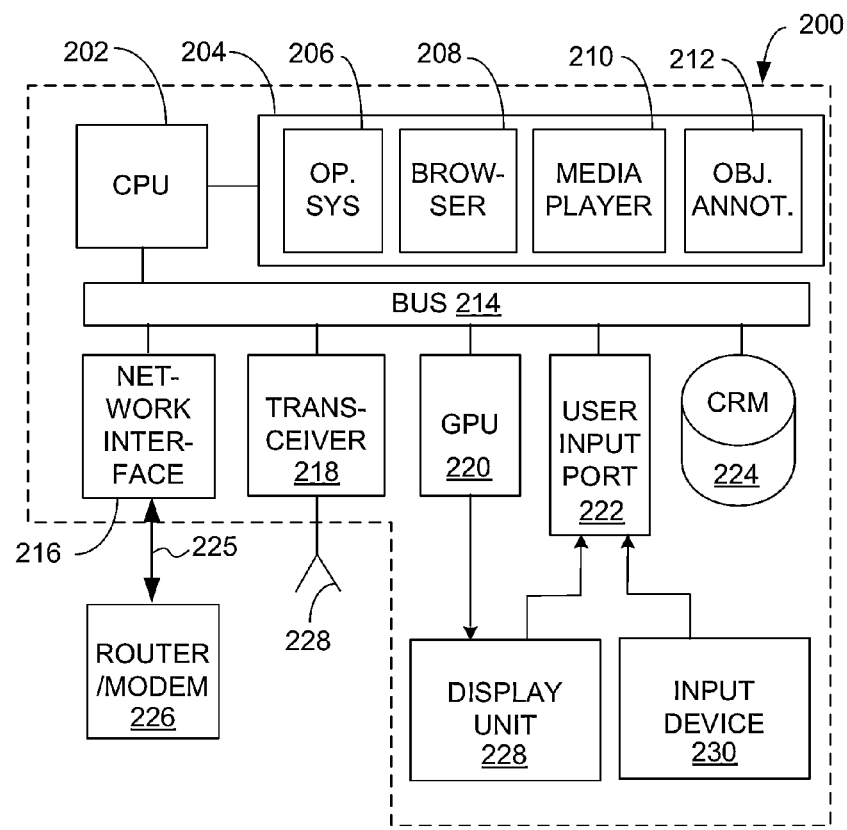
FIG. 2 is a schematic block diagram illustrating another embodiment of a computer system for supporting and executing the systems and methods described herein.

Referring to FIG. 2, a diagrammatic view of an example client device 200 is illustrated. One or more of the client devices 120, 122, 124, 126, 128 shown in FIG. 1 may be configured as or include such a client device 200, which may also be referred to as a computer, media player device, client, or client computer. In selected embodiments, the client device 200 may include a processor 202 operatively coupled to a processor memory 204, which holds binary-coded functional modules for execution by the processor 202. Such functional modules may include, for example, an operating system 206 for handling system functions such as input/output and memory access, a browser 208 for accessing information via the World Wide Web or similar network infrastructure, a media player 210 for playing streaming video and communicating with a streaming video system, and an object annotation component 212 (which may be integrated into the media player 210 or may be a separate component) for collecting user input regarding general objects and providing annotation information for objects appearing in video data. The memory 204 may include other functional modules, for example, modules for communicating with a server system, receiving user input, or displaying video output, as described in more detail herein below.

A bus 214 or other communication component may support communication of information within the computer 200. The processor 202 may be a specialized or dedicated microprocessor configured to perform particular tasks in accordance with the features and aspects disclosed herein by executing machine-readable software code defining the particular tasks. Processor memory 204 (e.g., random access memory (RAM) or other dynamic storage device) may be connected to the bus 214 or directly to the processor 202, and store information and instructions to be executed by a processor 202. The memory 204 may also store temporary variables or other intermediate information during execution of such instructions.

A computer-readable medium in a storage device 224 may be connected to the bus 214 and store static information and instructions for the processor 202; for example, the storage device 224 may store the modules 206, 208, and 210 when the client device 200 is powered off, from which the modules may be loaded into the processor memory 204 when the client 200 is powered up. The storage device 224 may include a non-transitory computer-readable medium holding information, instructions, or some combination thereof, for example instructions that when executed by the processor 202, cause the client device 200 to perform one or more client-side operations of a method as described herein.

A communication interface 216 may also be connected to the bus 214. The communication interface 216 may provide or support two-way data communication between the client device 200 and one or more external devices, e.g., the streaming system 100, optionally via a router/modem 226 and a wired or wireless connection 225. In the alternative, or in addition, the client device 200 may include a transceiver 218 connected to an antenna 228, through which the client 200 may communicate wirelessly with a base station for a wireless communication system or with the router/modem 226.

The client device 200 may be connected (e.g., via the bus 214 and graphics processing unit 220) to a display component 228. A display component 228 may include any suitable configuration for displaying information to a user of the client device 200. For example, a display component 228 may include or utilize a cathode ray tube (CRT), liquid crystal display (LCD), touchscreen LCD (e.g., capacitive display), light emitting diode (LED) display, projector, or other display device to present information to a user of the client device 200 in a visual display.

One or more input devices 230 (e.g., an alphanumeric keyboard, microphone, keypad, remote controller, game controller, camera or camera array) may be connected to the bus 214 via a user input port 222 to communicate information and commands to the client 200. In selected embodiments, an input device 230 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 228, for example using a touch sensitive screen. A cursor control device may communicate direction information and command selections to the processor 202 and control cursor movement on the display 228. A cursor control device may have two or more degrees of freedom, for example allowing the device to specify cursor positions in a plane or three-dimensional space.

The client device 200 may be used to transmit, receive, display, or otherwise process one or more streaming video programs. In selected embodiments, such transmitting, receiving, and displaying may be in response to the processor 202 executing one or more sequences of one or more instructions contained in main memory 204. Such instructions may be read into main memory 204 from another non-transitory computer-readable medium (e.g., a storage device 224).

Execution of sequences of instructions contained in main memory 204 may cause a processor 202 to perform one or more of the procedures or steps described herein. In selected embodiments, one or more processors 202 in a multi-processing arrangement may also be employed to execute sequences of instructions contained in main memory 204. Alternatively, or in addition thereto, firmware may be used in place of, or in combination with, software instructions to implement procedures or steps in accordance with the features and aspects disclosed herein. Thus, an apparatus embodying the features and aspects disclosed herein is not limited to any specific combination of hardware circuitry and software.

Figure 3:
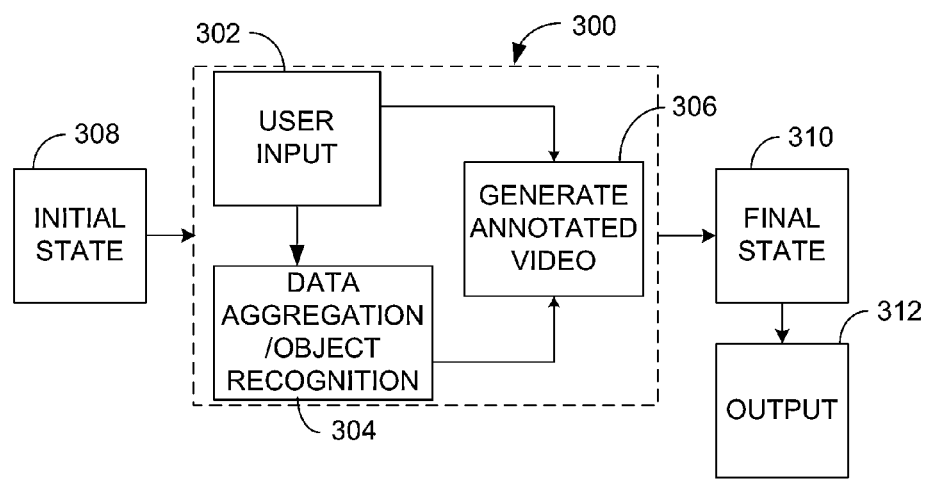
FIG. 3 is a schematic block diagram illustrating an embodiment of a system for annotating general objects in video data.

Referring to FIG. 3, general aspects of a general object annotation process 300 used for developing annotated video content is illustrated as a state diagram. The initial state 308 represents an initial set of non-annotated data comprising or included in a video streaming program. For example, video data as received from a content producer and formatted for video streaming may be initially devoid of any annotation information, or may include only a limited amount of annotation information supplied by the producer. The initial state 308 may be represented in a computer memory in as a video file and metadata that is devoid of annotation data, or includes only a limited amount of video data. As such, the initial state data 308 represents a physical state of a video output device that may be achieved at a later time when the video data is displayed or output on a client device.

The object annotation process 300 may include an input-output computation process performed by a computer processor, which operates on the initial state 308 to produce a final state 310 initially embodied in a memory of a computer server. The final state 310 can be manifested as physical output by transmitting to a client device, where it may be output 312 using the display device coupled to (or part of) the client. The object annotation process 300 may therefore operate as a state machine that accepts the initial state 308 and user input via an input device as inputs, and transforms the state data 308 representing many a physical state of a video output device into an altered final state 310.

The object annotation process 300 may include several interactive modules, for example, a user input module 302, a data aggregation, object recognition and tracking module 304 and an annotated video generation module 306. As will be described in more detail below, user input module 302 receives user input that annotates objects in the video data. The annotations may be associated with a tag that identifies or describes the object, such as the user input may draw a circle around a hat and tag the hat with the descriptor of "hat". The object recognition and tracking module 304 recognizes the object that the user input annotated, tracks the object across multiple frames, and combines multiple annotations into one annotation. The annotated video generation module 306 may enhance the video by adding the descriptor to the object and any other additional information, such as links. The process 300 may include other modules, for example, a user interface module, user tracking module, graphics module, etc., which for illustrative simplicity are not shown.

Figure 4:
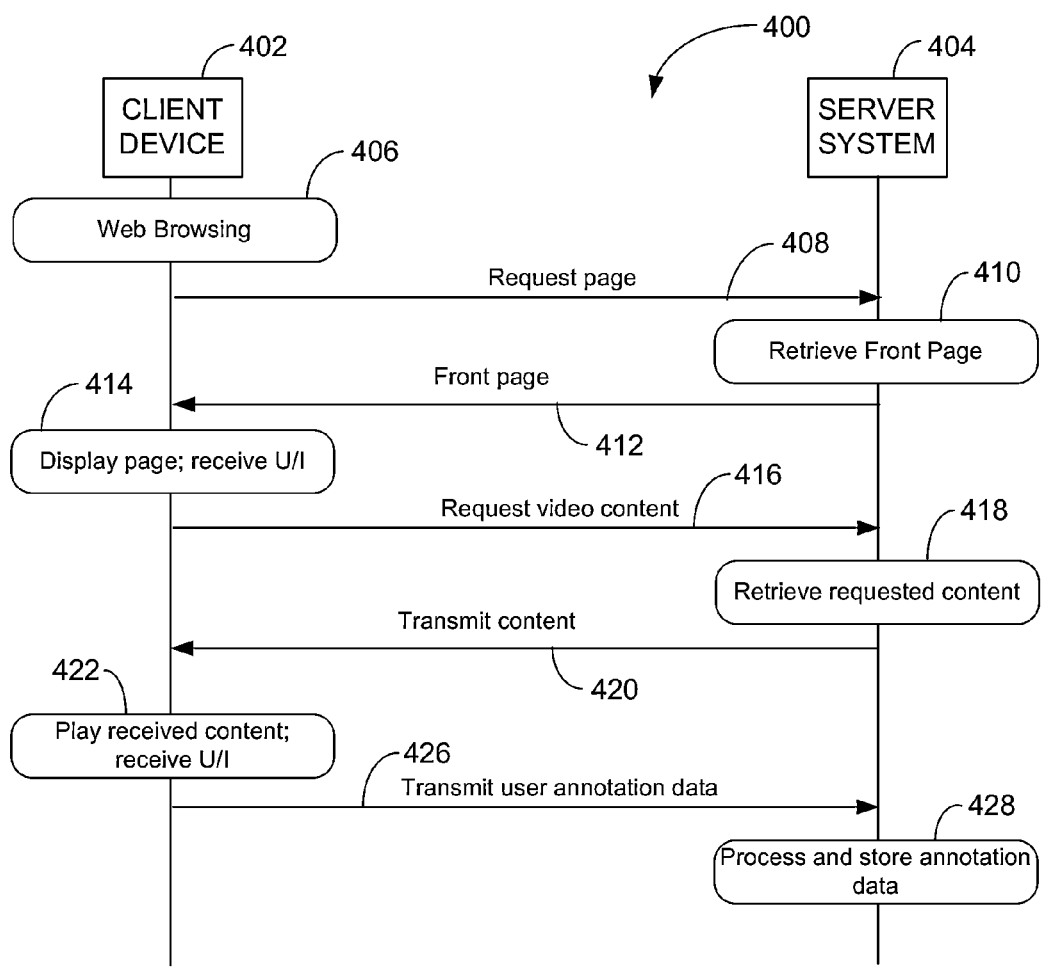
FIG. 4 is a sequence diagram illustrating an example of a call flow between a video server system and a video player client executing a method for collecting user input used in general object annotation.

FIG. 4 illustrates an example of a call flow 400 between a server system 404 and a client device 402 for collecting user input for object annotation in streaming video. The server 404 and the client device 402 may each be, or may include, a computing device including one or more processors coupled to a memory and other components as described in more detail herein, or as known in the art. The call flow 400 assumes video streaming is provided through a web page interface and streaming media player installed at the client device; however, the inventive concepts herein are not limited to such environments. If a web page environment is used, a call flow may initiate with the client device 402 performing a web browsing operation 406 and requesting 408 a web (e.g., World Wide Web) page from the server system 404 with links for requesting one or more video programs. The server system may retrieve a requested page 410 and serve it 412 to the client 402. For example, the web page may comprise a "home" or page including a list of selected video programs of general interest. The client device may display the page and receive user input 414 selecting one of the links, for example, a "point and click" input from a pointing device, a touch input on a touchscreen device, or a spoken command. In response to the input, the client device may, as shown at 416, request a specific video program by transmitting a Hypertext Transfer Protocol (HTTP) "get" request, or other suitable request message, to the server system 404. The client may also activate a media player component at the client device 402, in preparation for receiving the requested video content. The media player component may include, or be integrated with, a video annotation component for receiving user input and providing annotation data. The client device may, or may not, be required to identify a particular user or user account to receive the front page or streaming video.

At 418, the server may retrieve requested video program 418 and initiate a streaming session with the client 402 by streaming 420 the video program configured as a sequence of video data packets to the media player component on the client 402, using any suitable streaming protocol, for example, Real Time Streaming Protocol (RTSP). The video program when configured as streaming video may include one or more predefined ad slots. Using the local media player component, the client device may play the streaming video content to produce a local video output on a display device.

Leveraging on crowd sourcing and advanced computer vision technology, the system 400 may enable identification of certain kinds of general objects in shows/movies. Here the general objects refer to planar objects or articulated objects with abundant texture which occupy sufficient area in the video and can be handled by current object tracking technology. To be more specific, such objects may include, for example, images of people, clothes, bags, shoes, hats, cars, computers, art work or books.

The client 402 may include an interactive module active during play 422 of the video data enabling a user to pause play at any given frame of a video and start drawing a boundary, such as a polygon (or other delineation), to define object boundaries. Once finished, the interactive module may generate a prompt asking the user to provide a tag, such as a name and detailed attributes of the outlined object. The client may transmit 426 user annotation data to the server 404, which may store the user annotation data for later user in object tracking an annotation.

Figure 5:
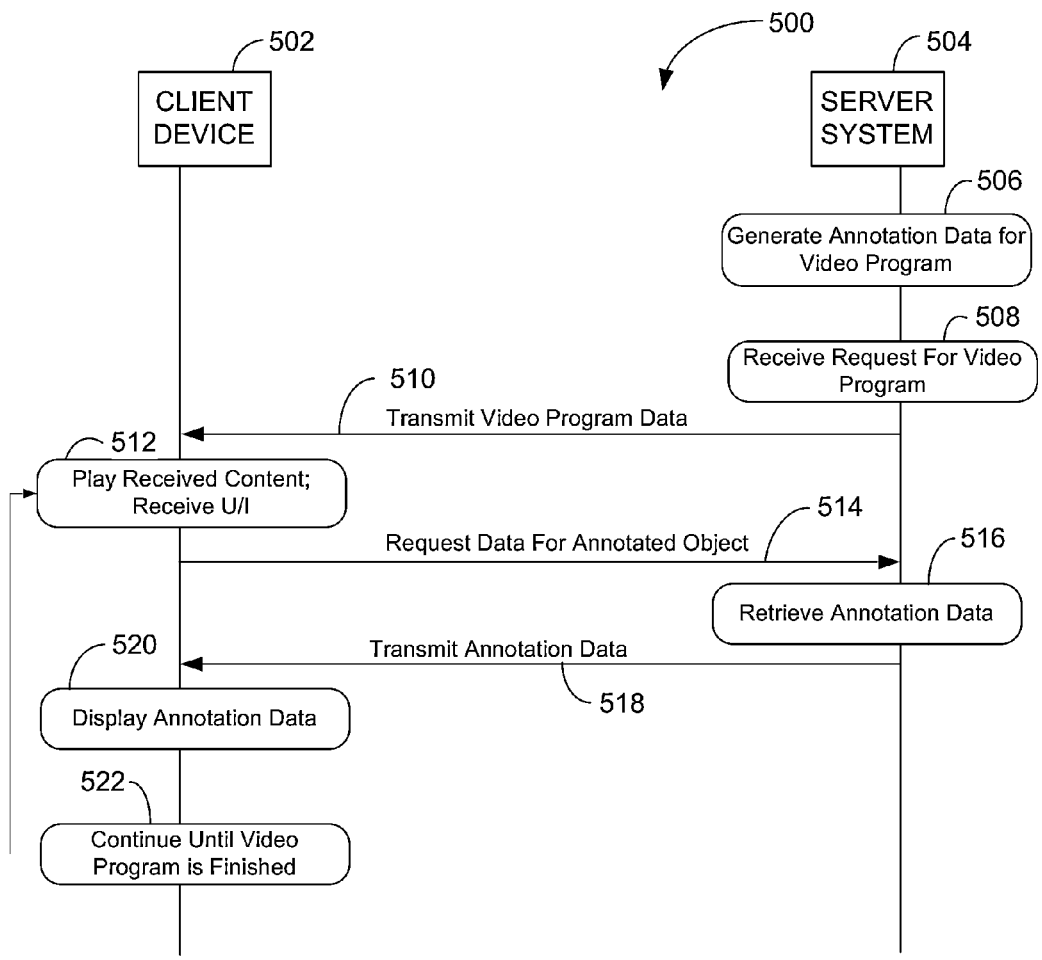
FIG. 5 is a sequence diagram illustrating an example of a call flow between a video server system and a video player client executing a method for providing streaming video with interactive general object annotation.

FIG. 5 shows an example of a call flow 500 between a server system 504 and a client device 502 for providing streaming video with object general annotation. For example, after annotation, a user may watch the video with annotations.

After collecting input data from one or more clients regarding an object appearing in a video, the server may, at 506 generate annotation data for the video program. For example, a tracking algorithm may analyze an outlined object and extract one or more (typically several) discriminative features useful for tracking the object through multiple frames. Subsequently, the object may be modeled as a volume of image pixels in a three-dimensional space. The tracked objects may be examined by professional annotators in the backend to eliminate noisy or non-cooperating users.

After receiving a request for a video program 508, the server 504 may transmit, at 510, the video program with interactive object annotation data to the client 502. The client 502 may play the received content 512 and receive input from the client requesting data for an annotated object. For example, the client device may detect that the user has selected an annotated object by providing input via a user input device. In response, the user device may, at 514, request data for the annotated object from the server system 504. At 516, the server may process the request and retrieve the requested annotation data. At 518, the server may transmit the annotation data to the client 502. At 520, the display device may display the annotation data using a display screen or the like. After displaying the annotation data, the client device may continue 522 playing the video until the program is finished or terminated, or until additional user input requesting information regarding the annotated object at 512.

Given the annotated objects, the system may enable a client to display the metadata of the available objects when other users watch the video in the future. For example, if any user hovers her mouse over the object or using other pointing devices, the client may in response pause the video and show the metadata or related product search result to the user. In addition, a few external product search engine may be called for further information about the identified object. The users may also be enabled to search products based on the appearance of the proxy object on major E-commerce sites. This kind of object information may also be valuable for displaying context relevant ads related to the specific objects. The system may display ads at the ad break point soon after the object appears.

The annotation may be used across different sites hosting the same video. Even when the video has been transformed or cropped, video alignment can be done to recover the correspondence among the original video and the cropped one.

The server system may obtain user input data identifying objects of interests from different users in different sessions involving the same video content. In such cases, different users may annotate the same object starting at different time points of the video. Therefore, the server may 1) group the isolated tracks of the same object in the same video, and 2) further extend the isolated tracks to other appearance in the video. In addition, object grouping across different videos can also be performed if necessary. Given the category of the annotated objects, the system may enable users to further provide brand suggestions for identified objects. The brand information can be further verified by professional annotators as well.

The following describes a process to perform the grouping of isolated tracks and extending the tracks. Referring to FIG. 6, a processing pipeline 600 for enabling interactivity in video content based on objects appearing in image frames of the video data may include various sub-processes as illustrated. A preliminary sub-process may include shot boundary detection 602. In shot boundary detection, an input video may be analyzed using a shot boundary detection algorithm to determine each shot boundary in the analyzed video. At 604, the system may receive user data annotating an area in a frame of the video for an object. The system may then extract features for the object based on the annotation and then track the object in other frames. Each complete video frame (e.g., I-frame or keyframe) may be densely sampled an object detection sub-process based on the annotations. Objects detected in the process 604 may provide a start point for the subsequent object tracking process 606. In the object tracking process 606, a tracking algorithm may be automatically applied to associate identified objects detected in a frame into connected groups of corresponding objects in other frames. After the object tracks are defined by the object tracking process 606, an object recognition and track tagging process 608 may automatically determine a tag for each object based on information from one or more client sessions, and tag each object track with the tag. The tag may be identification data (e.g., a name or description of the object). Optionally, in a quality control inspection sub-process 610, human annotators may inspect the tags assigned to each track and correct any erroneous tags. Finally, at 612, the video may be altered to include an interactive link to additional information, wherein the additional information is selected based on the tag assigned to an object track. The link may be positioned in a video layer based on the object track.

Shot Boundary Detection

Video may typically be composed of hundreds of shots, wherein each shot is made up of a continuous frame sequence captured in a single camera action. Shot boundary detection may be used to automatically locate an accurate boundary between two adjacent shots, without requiring any explicit definition of the shot boundaries from associated metadata or other source. In the shot boundary detection process at 602, a video may first be divided into separate shots using shot boundary detection, and then the object annotation process is performed for each separate shot.

There are several kinds of boundaries between two adjacent shots. Shot boundaries may generally be categorized into two types: abrupt transition (CUT) and gradual transition (GT). CUT is usually easy to detect since the change on the boundary is great. However, gradual transitions are commonly included in videos and are more difficult to detect. Considering the characteristics of different editing effects, GT may be further divided into dissolve, wipe, fade out/in (FOI), and so forth. Because there is a smooth transition from one shot to another, it may be difficult for an algorithm to automatically detect and/or decide the position of the shot boundary. In addition, it may be difficult to detect a difference between GT and fast movement in a single shot, because the image variation from frame-to-frame may be substantial but smooth in both cases.

A workflow for shot boundary detection may include three steps that may be performed in sequence. Each step may be performed automatically using a processing module in the video processing apparatus. In a first step, one or more features are extracted from video data to represent the video content. Video can be conceptualized as a three-dimensional signal made up two spatial dimensions and one time dimension. Comparing to a two-dimensional image, the extra dimension of video reflects the variations of video content along the time axes. To find the shot boundary, the video should be analyzed frame by frame. Each frame (e.g., I-frame or keyframe) may comprise a still color image with RGB channels.

One or more histograms based on image parameters may be extracted as representative features of a video frame. A color vector composed of color values of all pixels in a frame may also be representative; however, a color vector is very sensitive to movement and illumination. To eliminate sensitivity to illumination, the RGB (Red-Green-Blue) color space of a video frame may be transformed into a HSV (Hue, Saturation, Lightness) color space. To eliminate the sensitivity to movement, a color vector may be expressed as a color histogram. In the alternative, or in addition, a Local Binary Pattern (LBP) histogram may also be adopted to reduce sensitivity of the representative feature to variations in illumination. LBP is a texture descriptor based on a local geometric structure of image, and may be less sensitive to global illumination variation. To enhance robustness to noise, the uniform version of LBP histogram (HLBP) with 58 bins may be used, wherein the last (59th) bin is discarded as noise. An HSV histogram (HHSV) may include 72 bins, from the product of 8 (Hue), 3 (Saturation) and 3 (Value) quantized intervals.

In a second step, measurement of continuity across adjacent frames of a sequence may be developed, based on differences between the representative feature or features (e.g., LBP histogram or HSV histogram) in adjacent frames. The continuity measure may provide a quantitative indication of similarity between adjacent frames. A shot boundary may be detected by correlating minimums in the continuity measure to shot boundaries. The continuity measure may be considered as a one-dimensional temporal signal representing the video content.

In an aspect, the continuity measure may be developed by comparing adjacent sets of frames within a "window" of multiple frames. If the continuity measure is made only between two adjacent frames, gradual transitions may not be accurately detected because the variation between two adjacent frames may be small in this kind of transition. Thus, a larger window may be used to compute the continuity measure. FIG. 7 illustrates a window of 'K' frames 702, 704 sequenced along a time axis 700 according to one embodiment. The number 'K' may be an even integer greater than two, for example in the range of eight to 100. 'K' may be selected to be substantially lower than a minimal number of frames typically required for a shot. If most shots are longer than one second, for example, 'K' may be 30 or less. In the depicted example, 'K' is equal to fourteen and a shot boundary happens to be present after the first seven frames. Hence, half of the frames in the window of 'K' frames are in a pre-boundary set 702 and the other half in a post-boundary set 704. It should be appreciated, however that a shot boundary may occur anywhere in the window, or the window may not include any shot boundary.

The processor may use a histogram intersection method to measure the similarity of an arbitrary frame pair selected from the window of 'K' frames, weighted in inverse proportion to the distance 'n' between two frames in the pair. For example, a first frame 706 is four frames away from a fifth frame 708; a comparison (e.g., histogram intersection) between the frames 706 and 708 may yield a first similarity measure. The first frame is ten frames away from an eleventh frame 710; a comparison of these two frames 706, 710 may yield a second similarity measure that is weighted less than the first similarity measure because of the greater distance between the frames. A similarity measure may be obtained for every unique frame pair in the window.

In a third step, a processor may determine a position (and type) of shot boundary, based on a normalized cut curve for a moving frame window. Various approaches may be applied to determine the shot boundary. One approach may use a pre-defined threshold to classify the curve into two categories. Another approach may use machine learning techniques to train an algorithm to adopt an optimal classification, which may provide a more adaptive and robust solution.

User Input/Object Detection

Figure 8:
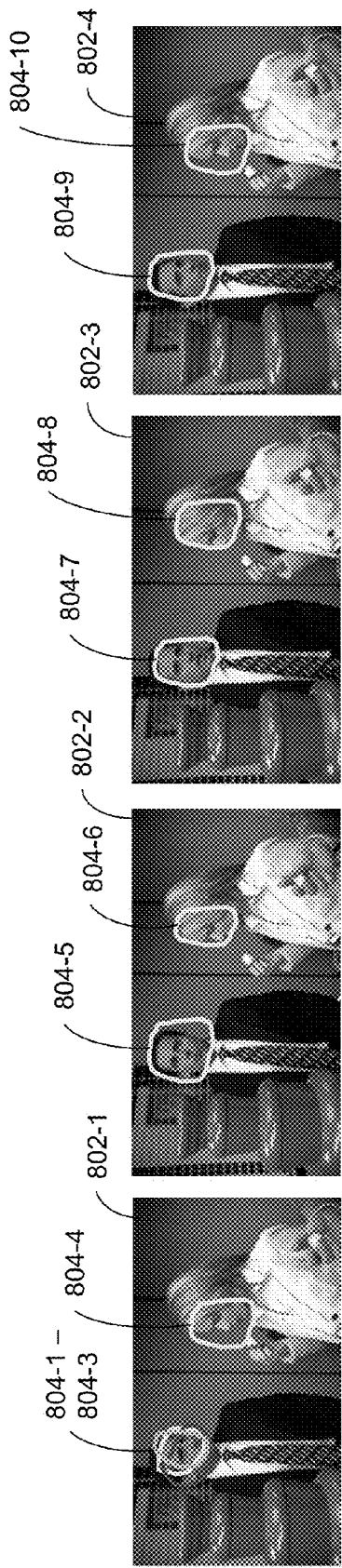
FIG. 8 shows multiple frames that include annotations on different frames according to one embodiment.

As mentioned above in 604, the user input/object detection process receives user input, such as annotations, that identifies objects in different frames. FIG. 8 shows multiple frames 802-1-802-4 that include annotations on different frames according to one embodiment. Frames 802-1-802-4 may form a shot that is determined as described above with respect to shot boundary detection. In each frame, one object may have one or more annotations. As seen in frame 802-1, multiple annotations are shown for a first object at 804-1-804-3. For example, three different user inputs annotating a person's head have been received. Also, another annotation 804-4 has been received for a second person's face. Similarly, in frames 802-2-802-4, annotations 804-5-804-10 have been received for the same two faces.

Each annotation 804 may annotate the object differently. For example, each annotation 804 may be a different size or may have different boundaries. Particular embodiments may normalize the annotations in one embodiment. For example, the user input/object detection process may determine a boundary, such as a rectangle box, that is based on the position of an annotation.

Figure 9:
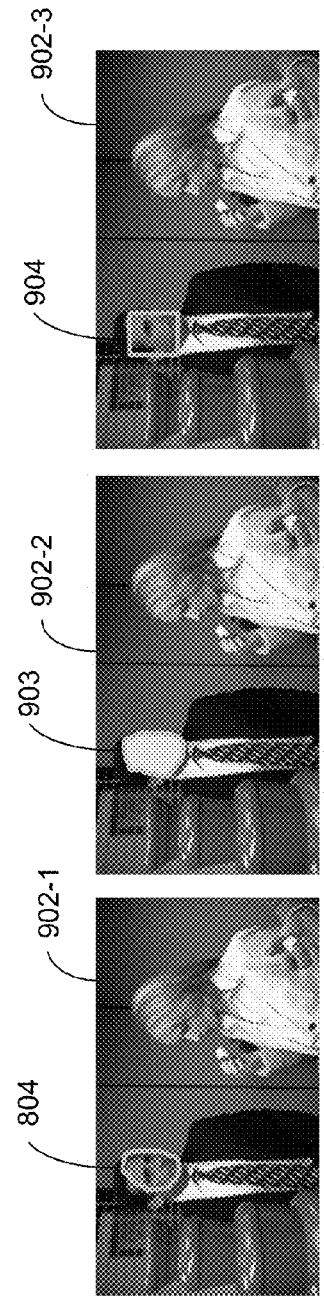
FIG. 9 depicts the object detection according to one embodiment.

For each annotation, the user input/object detection process segments the object given the coarse boundary of the annotation. FIG. 9 depicts the boundary detection according to one embodiment. The same frame 802 is shown at 902-1, 902-2, and 902-3 to illustrate the boundary detection process.

At 902-1, the frame is shown with an annotation 804 around an object, such as an actor's face. At 902-2, the same frame is shown where the user input/object detection process has segmented the object at 903 given the coarse boundary of annotation 804. Based on the segmenting, the boundary detection process determines a center of the annotation. Then, the user input/object detection process generates a rectangular box centered at the object. At shown at 902-3, the same frame is provided with a rectangle box 904 that is generated based on annotation 804 and the segmenting shown at 903. The rectangle box may approximate a boundary around an object that annotation 804 annotated. Although generating the rectangle box is described, particular embodiments may use other methods. For example, the generation of the rectangle box may not be necessary. However, generating a rectangle normalizes all the annotations into a standardized boundary for each annotation. Also, other boundaries may be used, such as circles and other shapes.

Figure 10:
FIGS. 10A-10C show an example of clustering according to one embodiment.

Once determining rectangular boxes for each annotation in each frame 802, the user input/object detection process then attempts to assign one rectangle box to an object. For example, the user input/object detection process may use a clustering algorithm that combines rectangle boxes into one rectangle box. The clustering algorithm may analyze the proximity of multiple rectangular boxes for an object to determine if the boxes should be clustered. For example, if the rectangle boxes overlap within a certain threshold, then the clustering algorithm determines that the rectangle boxes should be combined into one rectangle box. FIGS. 10A-10C show an example of clustering according to one embodiment. A same frame 802 is shown in FIGS. 10A-10C. In FIG. 10A, frame 802 includes multiple annotations 804-1-804-3 for an object. In FIG. 10B, the user input/object detection process has converted annotations 804-1-804-3 in the same frame 802 into multiple rectangle boxes 904-1-904-3. As shown, the same number of rectangle boxes (e.g., 3) as annotations (e.g., 3) form boundaries around the object. In FIG. 10C, in the same frame 802, the user input/object detection process has combined the multiple rectangle boxes shown at 904-1-904-3 into one rectangle box shown at 906. In this case, the combined rectangle box at 906 will represent the multiple annotations 804-1-804-3.

In one embodiment, the user input/object detection process may also add annotations to other frames in which annotations have not been received from users. This may create a continuous object track through multiple frames. The object track may also end at a termination condition. In other embodiments, only annotations that have been received from users are included in object tracks. This provides a record of which frames user's thought were important to annotate.

The combined rectangle box at 906 is then scored based on crowd sourcing information. For example, the score may be determined based on various methods. In one example, the number of users that previously annotated the object at 804 may affect the score. For example, if ten users provided annotations for the combined rectangle box for a first object and only three users annotated a combined rectangle box for a second object, then the first object would receive a higher score. The higher score may indicate that the combined rectangle box may be of a higher quality. That is, the higher quality may indicate the annotation for the combined box may be more accurate.

Object Tracking

Figure 11:
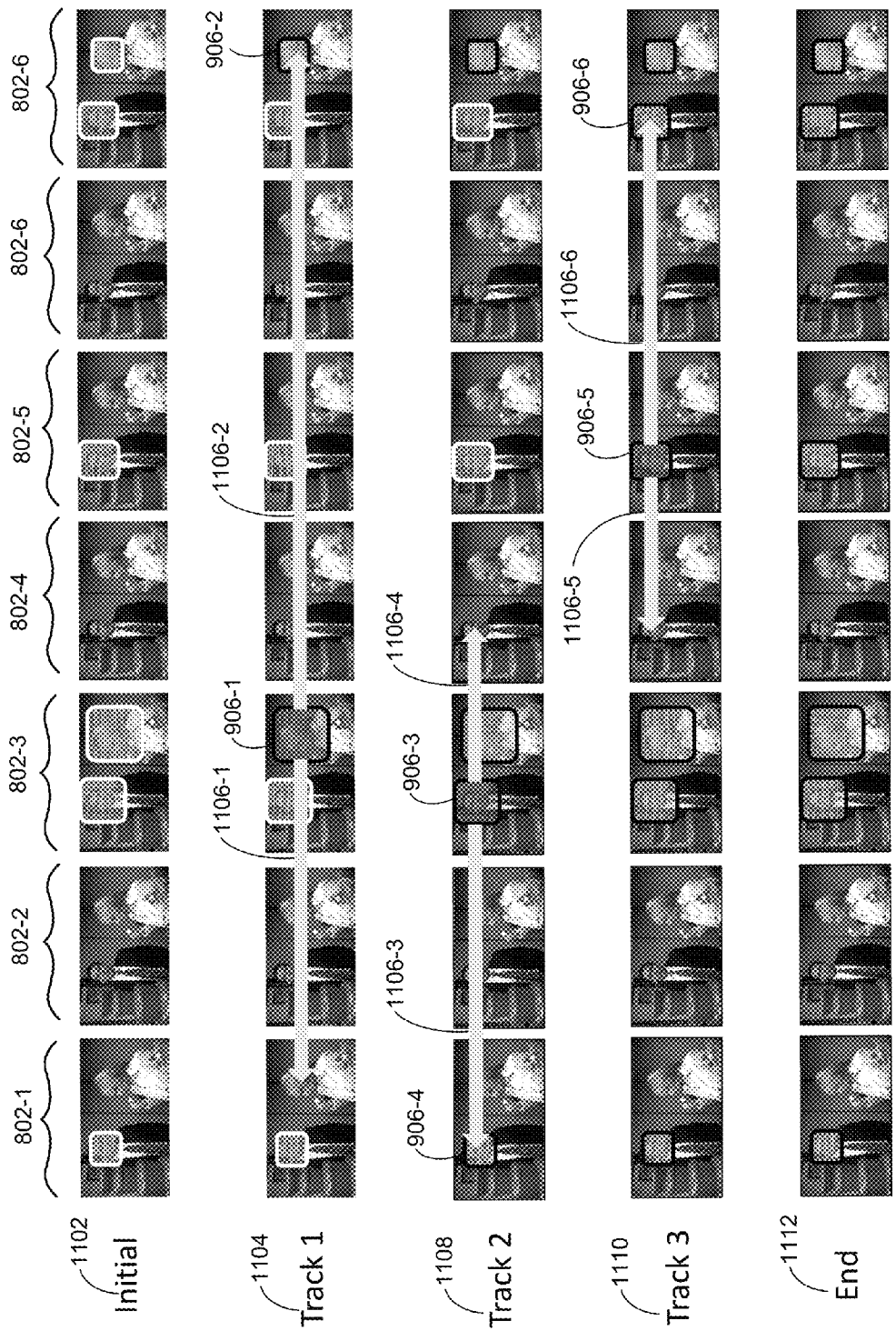
FIG. 11 shows the tracking process in more detail according to one embodiment.

After determining the rectangle boxes for each frame and different scores for each rectangle box, the object tracking process described above at 606 tracks the boxes in each frame. Tracking the boxes may form a track of boxes that are associated with the same object in different frames. Tracking the boxes allows the same tag to be associated with multiple annotations in multiple frames. FIG. 11 shows the tracking process in more detail according to one embodiment. The same set of frames 802 are shown for each stage of the tracking process labeled as Initial, Track 1, Track 2, Track 3, and End. In the initial stage shown at 1102, the object tracking process sets all boxes to a first status, such as "not tracked". This first status indicates that the boxes have not been tracked across multiple frames.

In a Track 1 stage shown at 1104, a first box 906-1 is tracked. In one embodiment, the object tracking process selects a box that has the highest score as a seed box because the object tracking process may want to determine tracks for the highest quality boxes first. The seed is the box that is used to find other boxes in the same track in other frames 802.

To start object tracking, the object tracking process first sets the seed box 906-1 to a second status indicating that it has been tracked, such as "is_tracked". The object tracking process then tracks backward and forward from the seed box as shown at 1106-1 in the backward direction and 1106-2 in the forward direction. The object tracking process merges any boxes for the same object that are detected in previous or subsequent frames into the track. For example, if the track meets another "not_tracked" box in another frame 802, the object tracking process may determine whether the not tracked box should be merged into the track. For example, a function may measure the overlap for the seed box 906-1 in frame 802-3 and a second box 906-2 shown in a frame 802-7 to determine if the boxes are annotating the same object. For example, if the overlap is within a threshold, then the object tracking process merges the box into the track for the seed box. Then, the object tracking process sets the status for box 906-2 as "is_tracked" and then continues to perform the tracking process.

The track terminates when a condition is met that ends the track, such as a terminal condition or a shot boundary. For the terminal condition, an error function may end the track because of conditions that may result in an error. For example, when the texture of the frame changes in an amount that is above the threshold, then the track may end because the tracking may not be accurate due to the changes in texture. Also, when a shot boundary is reached, the object tracking process ends the track.

Once the first track is finished, the object tracking process analyzes a second track, Track 2, shown at 1108. The object tracking process selects a second box 906-3 that has the next highest score in the not tracked status as the seed. Then, the object tracking process tracks forward and backward from the seed as described above. As shown, the object tracking process tracks backward at 1106-3 and forward at 1106-4. The forward track shown at 1106-4 stops at frame 802-2 because a terminal condition is met. That is, the texture of the scene between frames 802-3 and 802-4 may have deviated over a threshold and results in a terminal condition. The track backward shown at 1106-3 stops at a shot boundary. The object tracking process determines that a box 906-4 can be merged into the track and sets the status for box 906-4 as "is_tracked". This ends the second tracking process.

In a third tracking process, Track 3, shown at 1110, the object tracking process selects a box 906-5 as another seed that has the next highest score in the not-tracked status. At 1106-5 and 1106-6, the object tracking process tracks backward and forward, respectively. In the backward process, the tracking stops at a terminal condition at frame 802-4 and in the forward tracking process, the tracking process stops at a shot boundary. The object tracking process determines that a box 906-6 can be merged into the track and sets the status for box 906-6 as "is_tracked".

At the end of the tracking process shown at 1112, no other 'not tracked' boxes 906 exist in the set of frames to track.

After determining the tracks, the object tracking process may merge some tracks. For example, there may be different tracks that the object tracking process determined, but these tracks may be tracking the same object. FIGS. 12A and 12B show examples of merging tracks according to one embodiment. In FIG. 12A, a first track 1202-1 and a second track 1202-2 overlap both temporally and spatially. For example, the temporal overlap is shown at 1204 where track 1202-1 and track 1202-2 overlap in four different frames 802-5-802-8. Also, the overlap although not shown is spatial in that a box around the object in frames 802-5-802-8 also overlap. The object tracking process may determine that the spatial overlap is within a certain threshold. In this case, due to the temporal and spatial overlap, the object tracking process merges tracks 1202-1 and 1202-2.

In FIG. 12B, a track 1202-3 and a track 1202-4 do not overlap temporally but may have consistent crowd sourcing annotations. In this case, the annotations may be the same in both tracks 1202-3 and 1202-4 of "hat". In one embodiment, the boxes may not need to overlap spatially. However, in another embodiment, some spatial relatively is needed because multiple objects of the same annotation may be located in a same shot. For example, multiple hats may exist in a shot. Thus, the combination of the same annotation and spatial overlap may be needed to merge tracks 1202-3 and 1202-4.

Track Tagging

The track tagging described at 608 in FIG. 6 will now be described in more detail. As discussed above, tracks include multiple annotations that may be tagged via crowd sourcing information from users. In some cases, user input may be received that tags the annotations with different tags, such as a hat may include tags of "hat" and "cap". The track tagging process determines which tag to assign the annotation. FIG. 13 shows an example of tags according to one embodiment. In a frame 802-1, a user has tagged the annotation with "hat". Similarly, user input has been received indicating that the annotation has been tagged with hat in frames 802-4 and 802-8. However, user input has been received for frame 802-6 as cap. The track tagging process determines which of the tags should be assigned to the track. In one embodiment, track tagging process determines that the annotation with the most popular tag should be assigned to the track. For example, hat has been assigned as a tag three times versus cap once and thus the track tagging process assigns hat to the track.

Inspection

As discussed above, an inspection process optionally verifies the tag that is assigned by the track tagging process. For example, quality control personnel for a company (different from the users that entered the annotations) may verify that the tag is appropriate. Also, any noise is removed. For example, if hat and cap are not merged together, quality control may merge these tags together. Also, an object may be incorrectly tagged with a wrong identifier. In other embodiments, the tags may not be verified.

Add Link to Video

An add link to video process links the tag with the object in the video. Additional information may also be associated with the tag.

Figure 14A:
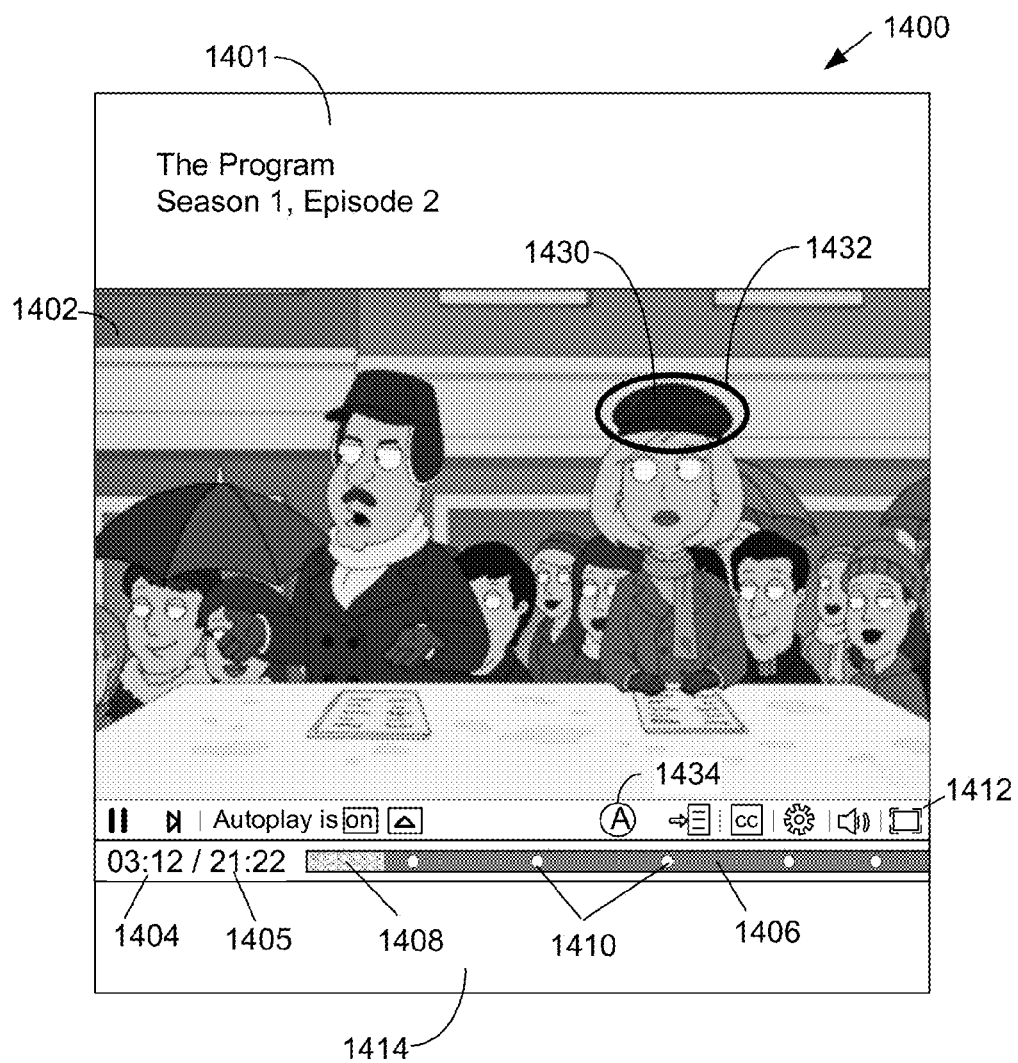
FIG. 14A is a simplified screenshot illustrating a user interface for providing user input used for object identification.

Referring to FIGS. 14A and 2, a client device 200 in accordance with the features and aspects disclosed herein may provide or support a graphical user interface 1400 that may be used to play (e.g., output a display based on a sequence of video data) streaming video programs, advertising and related data. Although represented diagrammatically by the outline 1400, it should be appreciated that the graphical user interface 1400 may be embodied as an input/output module executing on a client device that receives user input and generates responsive output. The user interface 1400 may generate and output a video player window 1402 to a display device, optionally with supplemental display areas, for example an upper area 1401 and a lower area 1414 for display of other information. The video window 1402 may include an image display portion displaying output frames of video data and a progress bar 1406 indicating progress of the video program. For example, a progress bar 1406 may include a progress indicator that automatically progresses (e.g., from left to right) during playing of a video file to indicate the current location of play.

The user interface module 1400 executing in the client device may control the progress indicator 1408 so that it moves in response to user input to change the location of play. The client device may include a tool bar 1412 or other control feature in the window 1402 to enable an unidentified user to control playback of a video file, to jump to a location within the video file, or the other video function. A tool bar 1412 may include convenient commands to play, pause, stop, reverse, fast forward, fast reverse, or the like or combinations or sub-combinations thereof. In addition, the tool bar 1412 may include an icon 1434 for activating an annotation function enabling a user to outline or otherwise indicate a specific area of the screen.

The client device may display a video portion of a video file in the image display portion of the video window 1402, while a outputting corresponding audio portion of the video file synchronously on an audio output device, for example, speakers. The client device may indicate a current temporal location of a displayed video and audio content in relation to the other content of a video file using the progress bar 1406. When paused, a current video still frame may be shown, essentially freezing a video presentation, audio presentation, or both. User selection of an annotation tool 1434 may cause the video to pause and enable the user to draw an outline 1432 around any area of the video frame to highlight an object. In FIG. 14, an outline 1432 has been drawn around a hat. After highlighting the object, the interface may enable the user to provide descriptive information for the selected object, for example, typing or saying "hat," "beret," etc., which is collected and provided to the server for further analysis. After providing the data, the video may continue playing. In an aspect, a user who highlights objects may be rewarded in some fashion, for example by receiving access to video content with a reduced number of advertisements.

Figure 14B:
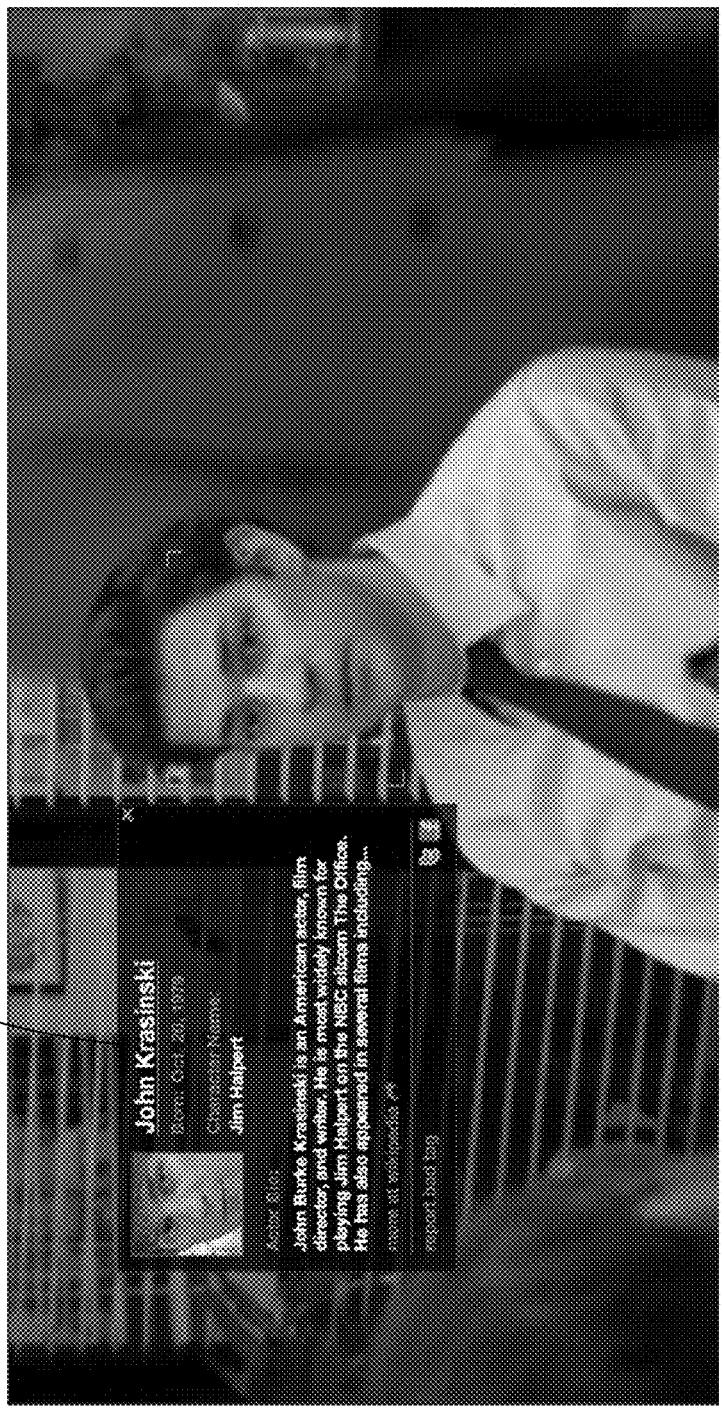
FIG. 14B depicts another example of video that has been supplemented with additional information after the annotation process according to one embodiment.

FIG. 14B depicts another example of video that has been supplemented with additional information after the annotation process according to one embodiment. A tag that has been inserted in the video for an object is shown at 1450. In this case, the tag may be "John Krasinski". The add link to video process may also add additional information, such as more information about the actor.

The foregoing examples may be embodied in one or more methodologies performed by a computer, for example a client device, server, or some combination of a client device and server. Methodologies that may be implemented in accordance with the disclosed subject matter will be better appreciated with reference to various flow charts. Although methodologies are shown and described as a series of acts/blocks for simplicity of illustration, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented using software, hardware, a combination thereof or any other suitable means (e.g., device, system, process, or component). Additionally, it should be further appreciated that methodologies disclosed throughout this specification are capable of being stored as encoded instructions and/or data on an article of manufacture, for example, a non-transitory computer-readable medium, to facilitate storing, transporting and transferring such methodologies to various devices. Those skilled in the art will understand and appreciate that a method could alternatively be represented as a series of interrelated states or events, such as in a state diagram.

General Object Annotations and Apparatus

Figure 15:
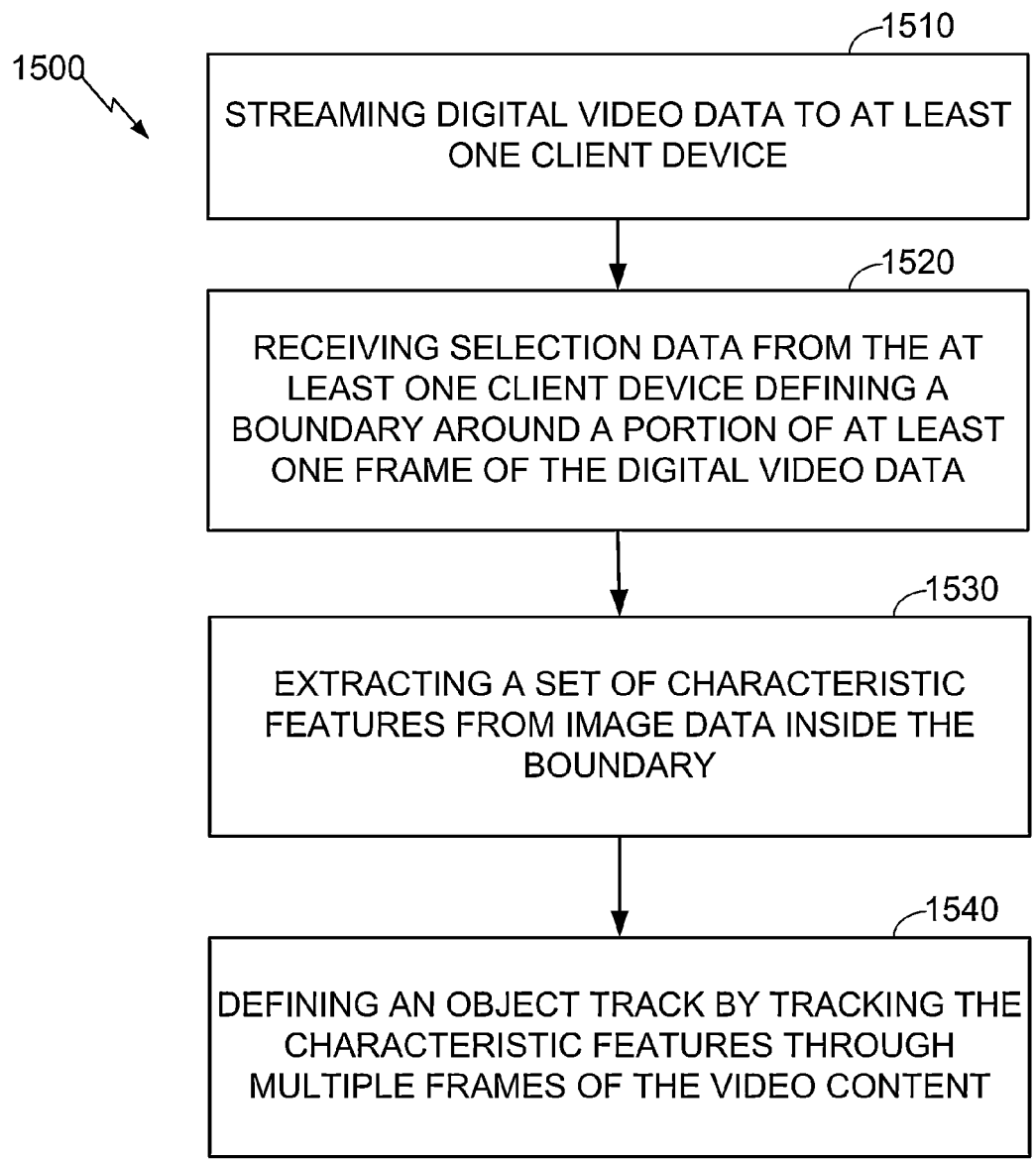

As shown in FIG. 15, a streaming video server may perform a method 1500 for annotating general objects appearing in video data. The method may include, at 1510, streaming digital video data to at least one client device. The method 1500 may further include, at 1520, receiving selection data from the at least one client device defining a boundary around a portion of at least one frame of the digital video data. For example, the server may receive frame and text data, where the frame data includes an outline drawn around a region within the frame.

The method 1500 may further include, at 1530, extracting a set of characteristic features from image data inside the boundary. This may include, for example, processing graphic data within the indicated outline to model three-dimensional or two-dimensional objects appearing within the boundary. The server may also improve the boundary definition using edge detection within the user-supplied outline.

The method 1500 may further include, at 1540, defining an object track by tracking the characteristic features, such as a box, through multiple frames of the video content. Tracking may be performed forward and backwards from an initial frame, up to shot boundaries or a terminal condition as detected in an additional process. Overlapping object tracks may be detected based on similarities and merged into a single track.

With reference to FIGS. 16-20, several additional operations 1600, 1700, 1800, 1900 and 2000 are depicted for annotating general objects appearing in video data, which may be performed by a computer server, alone or in combination with a client device and/or another server. One or more of operations 1600, 1700, 1800, 1900 and 2000 may optionally be performed as part of method 1500. The elements 1600, 1700, 1800, 1900 and 2000 may be performed in any operative order, or may be encompassed by a development algorithm without requiring a particular chronological order of performance. Operations can be independently performed and are not mutually exclusive. Therefore any one of such operations may be performed regardless of whether another downstream or upstream operation is performed. For example, if the method 1500 includes at least one of the operations 1600, 1700, 1800, 1900 and 2000, then the method 1500 may terminate after the at least one operation, without necessarily having to include any subsequent downstream operation(s) that may be illustrated.

With reference to FIG. 16, the operations 1600 may be performed in combination with method 1500, or independently as a separate method. In the later case, the independent method may include the initial operation 1510 of method 1500. In the former case, the method 1500 may further include, at 1610, configuring at least one user-selectable link to be activated along the object track through multiple frames of the video data, wherein the user-selectable link comprises a data address for obtaining additional information about an object identified with the characteristic features.

The method 1500 may further include, at 1620, storing the video data associated with the user-selectable link in a computer memory. In embodiments providing such interactive objects, the method 1500 may further include, at 1630, storing the additional information about the object in a memory location addressed by the data address. In addition, the method 1500 may include, at 1640, serving the video data associated with the link to a client device. The method 1500 may further include, at 1650, serving the additional information about the object to the client device, in response to selection of the link at the client device.

Figure 17:
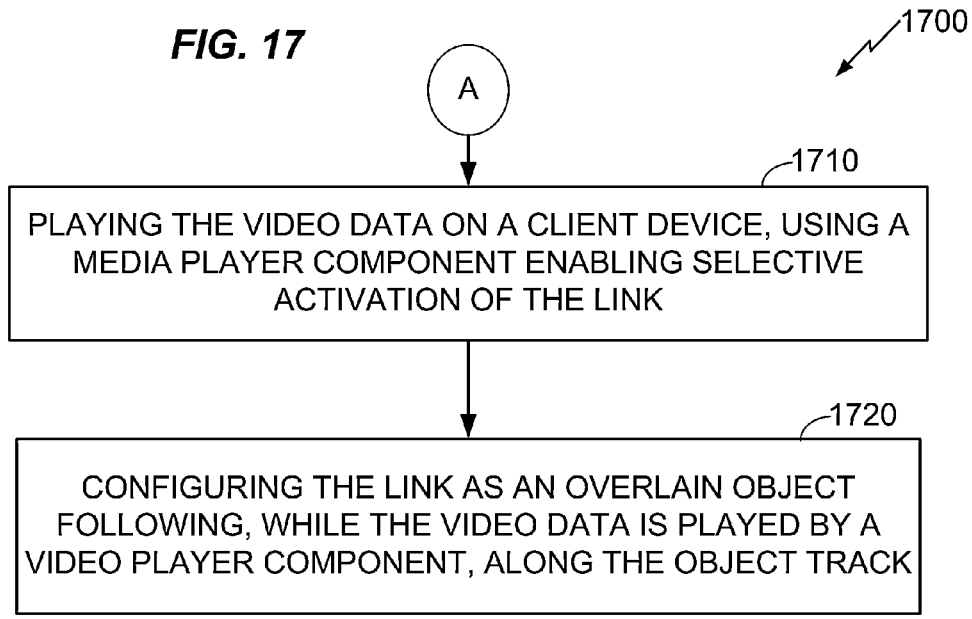

With reference to FIG. 17, the method 1500 may further include, at 1710, playing the video data on a client device, using a media player component enabling selective activation of the link. Accordingly, method 1500 may further include, at 1720, configuring the link as an overlain object following, while the video data is played by a video player component, along the object track.

Figure 18:
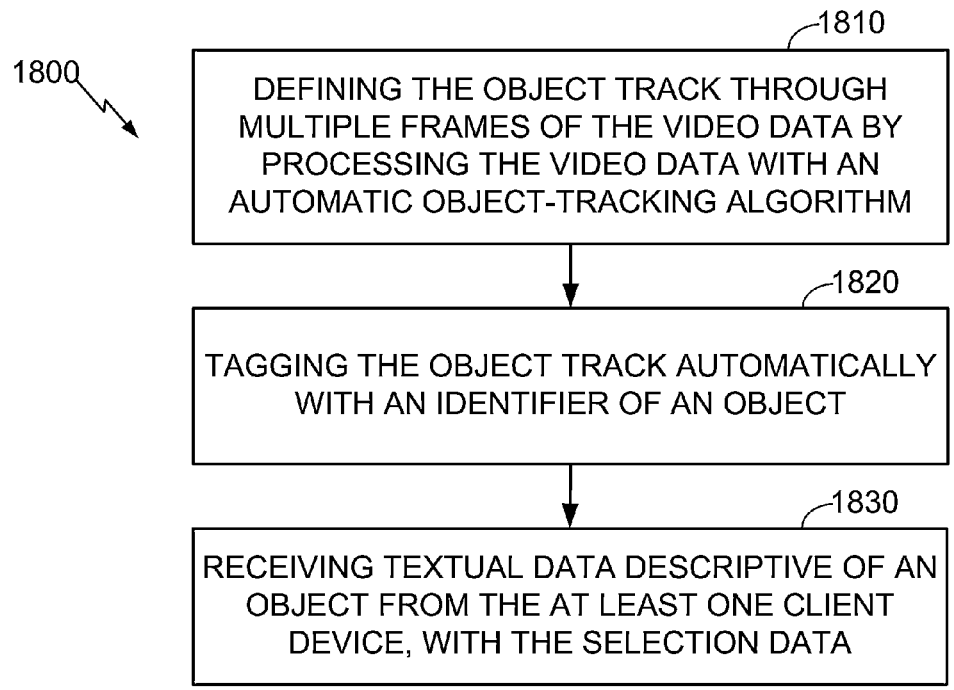

With reference to FIG. 18, the method 1500 may further include, at 1810, defining the object track through multiple frames of the video data by processing the video data with an automatic object-tracking algorithm. The method may further include, at 1820, tagging the object track automatically with an identifier of an object. The method may further include, at 1830, receiving textual data descriptive of an object from the at least one client device, with the selection data.

Figure 19:
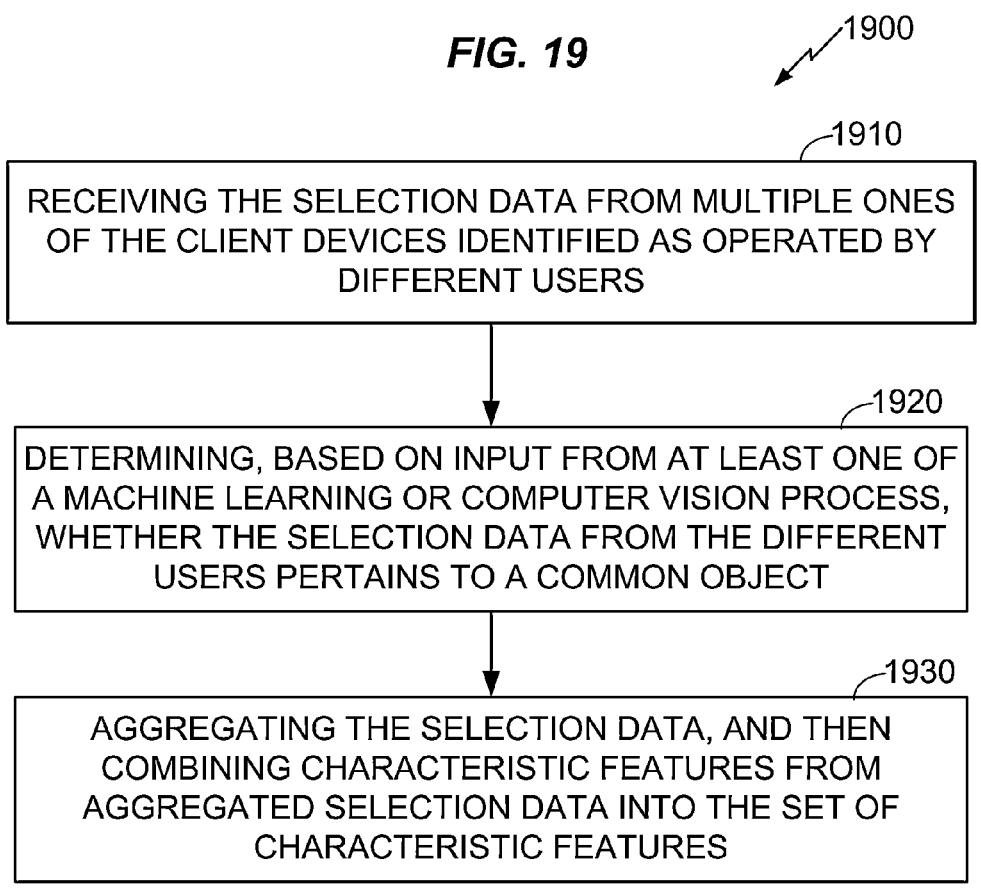

Referring to FIG. 19, the method 1500 may further include, at 1910, receiving the selection data from multiple ones of the client devices identified as operated by different users. The method 1500 may further include, at 1920, determining, based on input from at least one of a machine learning or computer vision process, whether the selection data from the different users pertains to a common object. The method 1500 may further include, at 1930, aggregating the selection data, and then combining characteristic features from aggregated selection data into the set of characteristic features, such as a single box.

Figure 20:
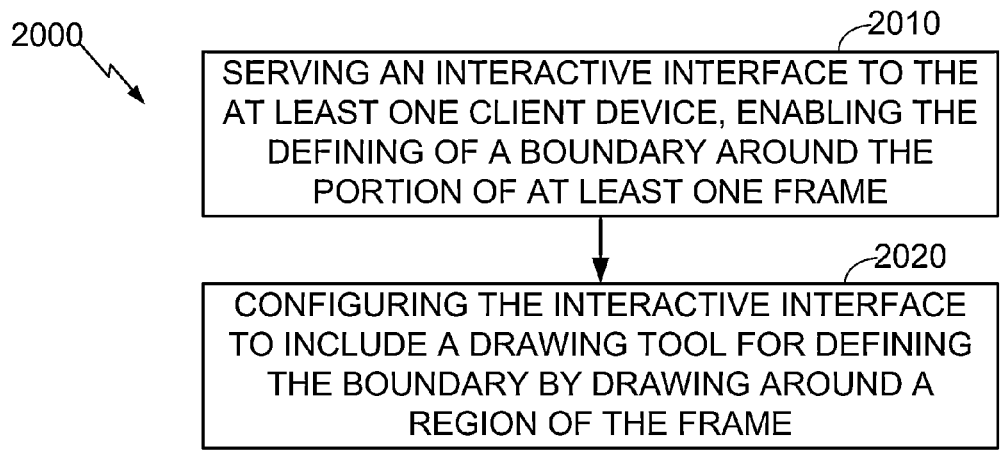

Referring to FIG. 20, the method 1500 may further include, at 2010, serving an interactive interface to the at least one client device, enabling the defining of a boundary around the portion of at least one frame. In an aspect, the method 1500 may further include, at 2020, configuring the interactive interface to include a drawing tool for defining the boundary by drawing around a region of the frame.

Figure 21:
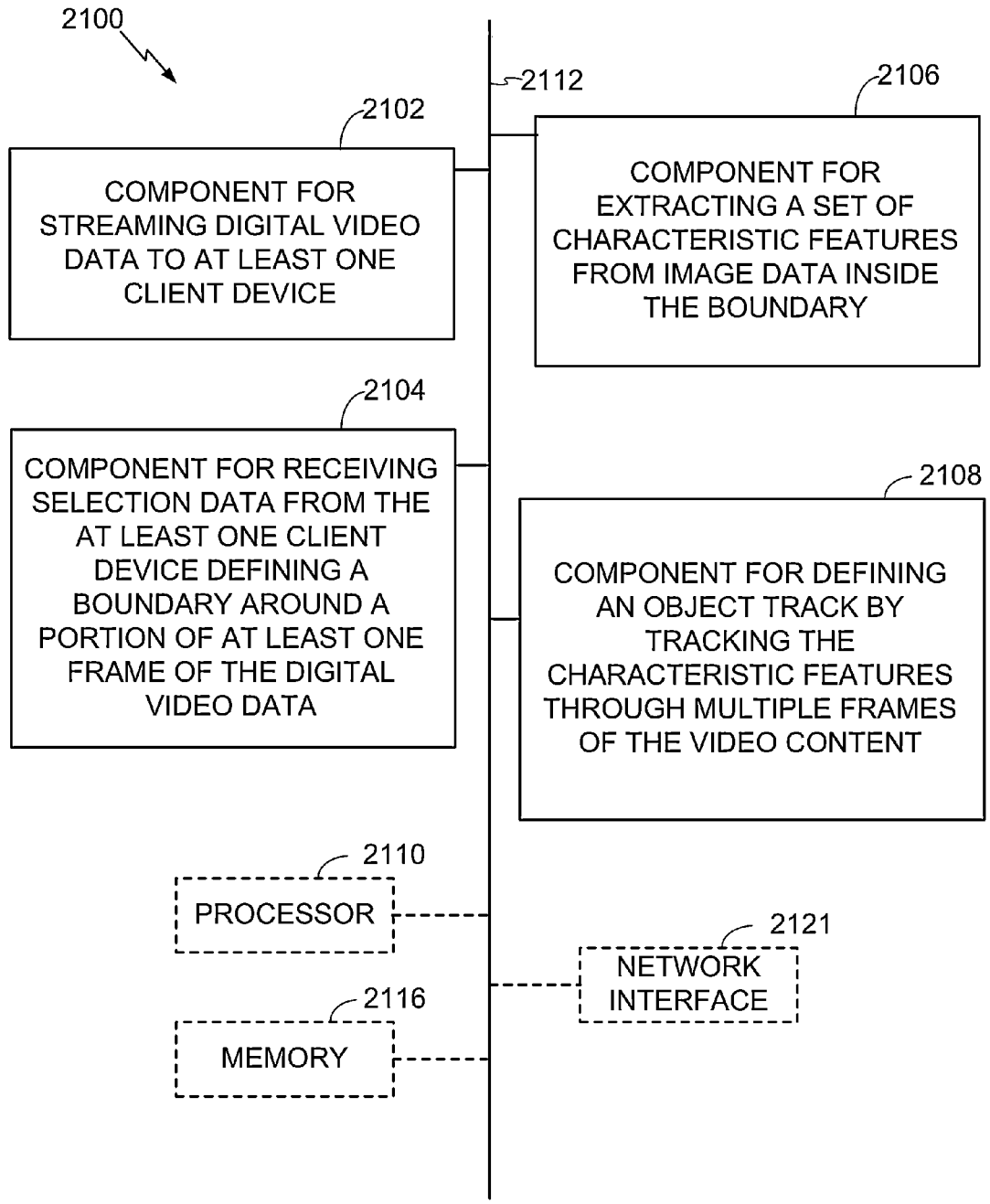
FIG. 21 is a diagram illustrating a server apparatus configured for general object annotation in video data.

With reference to FIG. 21, there is provided an exemplary apparatus 2100 that may be configured as computer server, client device, or combination of client and server, for annotating general object in video data. The apparatus 2100 may include functional blocks that can represent functions implemented by a processor, software, or combination thereof (e.g., firmware).

As illustrated, in one embodiment, the apparatus 2100 may include an electrical component or means 2102 for streaming digital video data to at least one client device. For example, the electrical component or means 2102 may include at least one control processor 2110 coupled to a memory component 2116. The control processor may operate an algorithm, which may be held as program instructions in the memory component. The algorithm may include, for example, delivering a video stream via HTTP and TCP via a WAN 112, or using RSTP (real time streaming protocol) and UDP (user datagram protocol) instead.

The apparatus 2100 may further include an electrical component or module 2104 for receiving selection data from the at least one client device defining a boundary around a portion of at least one frame of the digital video data. For example, the electrical component or means 2104 may include at least one control processor 2110 coupled to a memory component 2116. The control processor may operate an algorithm, which may be held as program instructions in the memory component. The algorithm may include, for example, receiving vector or polynomial data defining an outline associated with a frame of the video data.

The apparatus 2100 may further include an electrical component or module 2106 for extracting a set of characteristic features from image data inside the boundary. For example, the electrical component or means 2106 may include at least one control processor 2110 coupled to a memory component 2116. The control processor may operate an algorithm, which may be held as program instructions in the memory component. The algorithm may include, for example, performing edge detection within and/or near an outline to detect the edges of a selected object, and analyzing graphics data within object edges to define characteristic features. The algorithm may further include developing a three-dimensional model based on two-dimensional image data.

The apparatus 2100 may further include an electrical component or module 2108 for defining an object track by tracking the characteristic features through multiple frames of the video content. For example, the electrical component or means 2108 may include at least one control processor 2110 coupled to a memory component 2116. The control processor may operate an algorithm, which may be held as program instructions in the memory component. The algorithm may include, for example, identifying the object in adjacent frames and associating the object from adjacent frames to develop object tracks.

The apparatus 2100 may include similar electrical components for performing any or all of the additional operations 2000, 2100 and 1500 described in connection with FIGS. 20-15, which for illustrative simplicity are not shown in FIG. 21.

In related aspects, the apparatus 2100 may optionally include a processor component 2110 having at least one processor, in the case of the apparatus 2100 configured as a network entity. The processor 2110, in such case, may be in operative communication with the components 2102-1408 or similar components via a bus 2112 or similar communication coupling. The processor 2110 may effect initiation and scheduling of the processes or functions performed by electrical components 2102-1408.

In further related aspects, the apparatus 2100 may include a network interface component 2114 enabling communication between a client and a server. The apparatus 2100 may optionally include a component for storing information, such as, for example, a memory device/component 2116. The computer readable medium or the memory component 2116 may be operatively coupled to the other components of the apparatus 2100 via the bus 2112 or the like. The memory component 2116 may be adapted to store computer readable instructions and data for implementing the processes and behavior of the components 2102-1408, and subcomponents thereof, or the processor 2110, or the methods disclosed herein. The memory component 2116 may retain instructions for executing functions associated with the components 2102-1408. While shown as being external to the memory 2116, it is to be understood that the components 2102-1408 can exist within the memory 2116.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The term "non-transitory computer-readable medium" as used herein may refer to any medium that participates in holding instructions for execution by a processor, or that stores data for processing by a computer. Such a medium may take many forms, including but not limited to, non-volatile media, volatile media, and temporary storage media (e.g., cache memory). Non-volatile media may include optical discs or magnetic disks. Volatile media may include random-access memory (RAM). Common forms of non-transitory computer-readable media may include, for example, a hard (magnetic media) disk, magnetic tape, or any other magnetic medium, a CD-ROM, DVD, Blu-ray or other optical disc or medium, RAM, PROM, EPROM, FLASH-EPROM, any other memory card, chip, or cartridge, or any other memory medium from which a computer can read.

Those of skill would further appreciate that the various illustrative logical blocks, modules, circuits, and algorithm steps described in connection with the embodiments disclosed herein may be implemented using electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for annotating general objects contained in video content, the method comprising:
   sending the video content to a client device, the video content being requested by a user from a video delivery service;
   receiving a first annotation from the client device defining a first boundary around a portion of a first frame of the video content;
   selecting the first annotation as a seed for an object;
   tracking the first annotation through multiple frames of the video content based on a position of the first boundary, wherein the tracking is performed backwards and forwards until a condition is met;
   determining second annotations that include second boundaries that match the position of the first boundary for the first annotation within a first threshold, the second annotations being received from other client devices and being located in the first frame or other frames from the first frame;
   generating a third annotation for the object, the third annotation generated automatically from analyzing the video content;
   determining the third annotation matches the first annotation within a second threshold;
   combining the third annotation, the second annotations, and the first annotation into an object track for the object; and
   associating a tag with the object in the object track, the tag being input by at least one of the client devices.

2. The method of claim 1, further comprising configuring at least one user-selectable link to be activated along the object track through multiple frames of the video content, wherein the user-selectable link comprises a data address for obtaining additional information about the object.

3. The method of claim 2, further comprising serving the video content associated with the link to a client device.

4. The method of claim 2, further comprising sending the video content to a client device that uses a video player component that enables selective activation of the link.

5. The method of claim 2, further comprising configuring the link as an overlain object following along the object track while the video content is played by a video player component.

6. The method of claim 1, further comprising defining the object track through multiple frames of the video content by processing the video content with an automatic object-tracking algorithm.

7. The method of claim 1, further comprising determining whether the second annotations from the other client devices pertain to the object that is annotated by the first annotation.

8. The method of claim 1, further comprising
   determining one or more annotations in the first frame that are associated with the object; and
   merging the one or more annotations with the first annotation.

9. The method of claim 1, wherein the object track comprises a first object track, and wherein merging comprises
   determining a second object track;
   determining the first object track and the second object track overlap spatially and temporally within a threshold; and
   merging the first object track and the second object track when the first object track and the second object track overlap spatially and temporally within the threshold.

10. The method of claim 1, wherein the object track comprises a first object track, and wherein merging comprises
    determining a second object track;
    determining the first object track and the second object track have tags that are determined to be similar; and
    merging the first object track and the second object track when the first object track and the second object track have tags that are determined to be similar.

11. The method of claim 1, further comprising receiving the tag with the first annotation from the client device.

12. The method of claim 1, further comprising serving an interactive interface to the at least one client device enabling the defining of the boundary around the portion of the first frame.

13. The method of claim 12, wherein the interactive interface is configured to include a drawing tool for defining the boundary by drawing around a region of the frame.

14. An apparatus, comprising:
at least one processor configured for:
sending video content to a client device, the video content being requested by a user from a video delivery service;
receiving a first annotation from the client device defining a first boundary around a portion of a first frame of the video content;
selecting the first annotation as a seed for an object;
tracking the first annotation through multiple frames of the video content based on a position of the first boundary, wherein the tracking is performed backwards and forwards until a condition is met;
determining second annotations that include second boundaries that match the position of the first boundary for the first annotation within a first threshold, the second annotations being received from other client devices and being located in the first frame or other frames from the first frame;
generating a third annotation for the object, the third annotation generated automatically from analyzing the video content;
determining the third annotation matches the first annotation within a second threshold;
combining the third annotation, the second annotations, and the first annotation into an object track for the object; and
associating a tag with the object in the object track, the tag being input by at least one of the client devices.

15. The apparatus of claim 14, wherein the processor is further configured for configuring at least one user-selectable link to be activated along the object track through multiple frames of the video content, wherein the user-selectable link comprises a data address for obtaining additional information about the object.

16. The apparatus of claim 14, wherein the processor is further configured for determining whether the second annotations from the second client devices pertain to a common object that is annotated by the first annotation.

17. The apparatus of claim 14, wherein the processor is further configured for:
determining one or more annotations in the first frame that are associated with object; and
merging the one or more annotations with the first annotation.

18. The apparatus of claim 14, wherein the object track comprises a first object track, and wherein merging comprises determining a second object track;
determining the first object track and the second object track overlap spatially and temporally within a threshold; and
merging the first object track and the second object track when the first object track and the second object track overlap spatially and temporally within the threshold.

19. The apparatus of claim 14, wherein the object track comprises a first object track, and wherein merging comprises determining a second object track;
determining the first object track and the second object track have tags that are determined to be similar; and
merging the first object track and the second object track when the first object track and the second object track have tags that are determined to be similar.

20. A non-transitory computer-readable medium encoded with instructions that when executed by a processor cause a computer to perform the operations of:
sending video content to a client device, the video content being requested by a user from a video delivery service;
receiving a first annotation from the client device defining a first boundary around a portion of a first frame of the video content;
selecting the first annotation as a seed for an object;
tracking the first annotation through multiple frames of the video content based on a position of the first boundary, wherein the tracking is performed backwards and forwards until a condition is met;
determining second annotations that include second boundaries that match the position of the first boundary for the first annotation within a first threshold, the second annotations being received from other client devices and being located in the first frame or other frames from the first frame;
generating a third annotation for the object, the third annotation generated automatically from analyzing the video content;
determining the third annotation matches the first annotation within a second threshold;
combining the third annotation, the second annotations, and the first annotation into an object track for the object; and
associating a tag with the object in the object track, the tag being input by at least one of the client devices.

* * * * *